United States Patent

Kato et al.

[11] Patent Number: 6,084,861
[45] Date of Patent: Jul. 4, 2000

[54] RADIO COMMUNICATION SYSTEM

[75] Inventors: Shuzo Kato, Yokohama; Kazuhiko Seki, Tokyo, both of Japan; Hiep Van Pham, San Diego, Calif.

[73] Assignee: Uniden Corporation, Tokyo, Japan

[21] Appl. No.: 08/854,209

[22] Filed: May 9, 1997

[30] Foreign Application Priority Data

Aug. 23, 1996 [JP] Japan ................................ 8-222894

[51] Int. Cl.$^7$ ........................................................ H04J 3/00
[52] U.S. Cl. ........................ 370/280; 370/336; 370/345; 370/468
[58] Field of Search ........................... 370/280–311, 328, 370/329, 336–345, 465, 468, 470, 337, 346, 347, 348, 349, 442

[56] References Cited

U.S. PATENT DOCUMENTS

| | | | |
|---|---|---|---|
| 5,200,956 | 4/1993 | Pudney et al. | 370/280 |
| 5,490,136 | 2/1996 | Sereno et al. | 370/468 |
| 5,671,219 | 9/1997 | Jensen et al. | 370/280 |
| 5,802,046 | 9/1998 | Scott | 370/280 |
| 5,907,555 | 5/1999 | Raith | 370/468 |
| 5,930,246 | 7/1999 | Akutsu | 370/337 |

FOREIGN PATENT DOCUMENTS

| | | |
|---|---|---|
| 62-21338 | 1/1987 | Japan. |
| 7-30527 | 1/1995 | Japan. |
| 8-46561 | 2/1996 | Japan. |
| 8-70273 | 3/1997 | Japan. |

Primary Examiner—Ricky Ngo
Attorney, Agent, or Firm—McDermott, Will & Emery

[57] ABSTRACT

A radio communication system in which each frame having an imbalanced transmission speed is time-divided to a low speed transmission area and to a high speed transmission area according to a specified ratio in the time domain. An upload signal as a first-directional signal and a download signal as a second-directional signal are allocated to the low speed transmission area and to the high speed transmission area respectively. In a case where a high speed transmission request is issued from a personal station (PS) to a base station (BS), the order of the upload signal and that of the download signal is exchanged in the time domain within one frame, so that the download signal and the upload signal are allocated to the low speed transmission area and the high speed transmission area respectively.

20 Claims, 11 Drawing Sheets

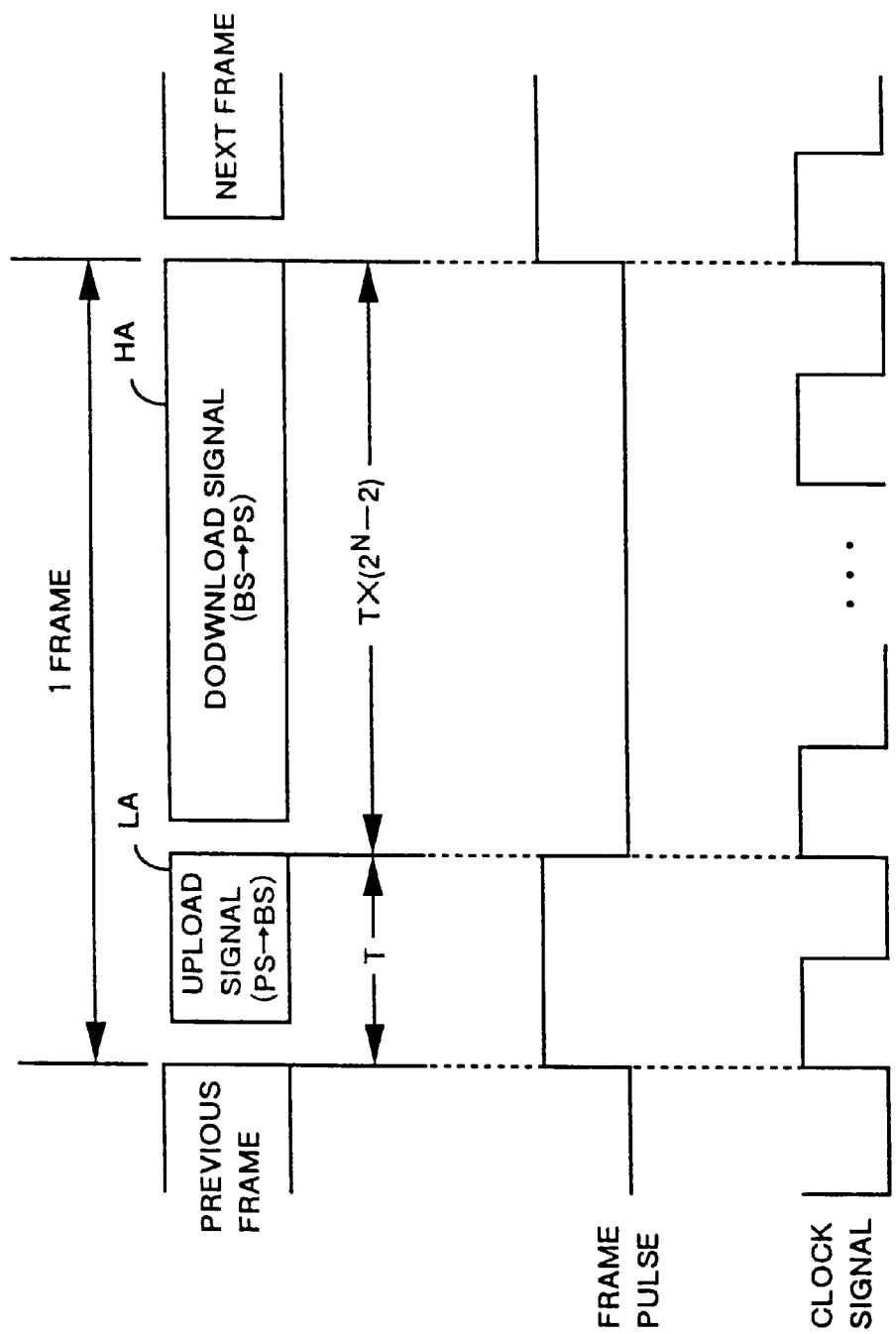

DOWNLOAD FRAME

UPLOAD FRAME

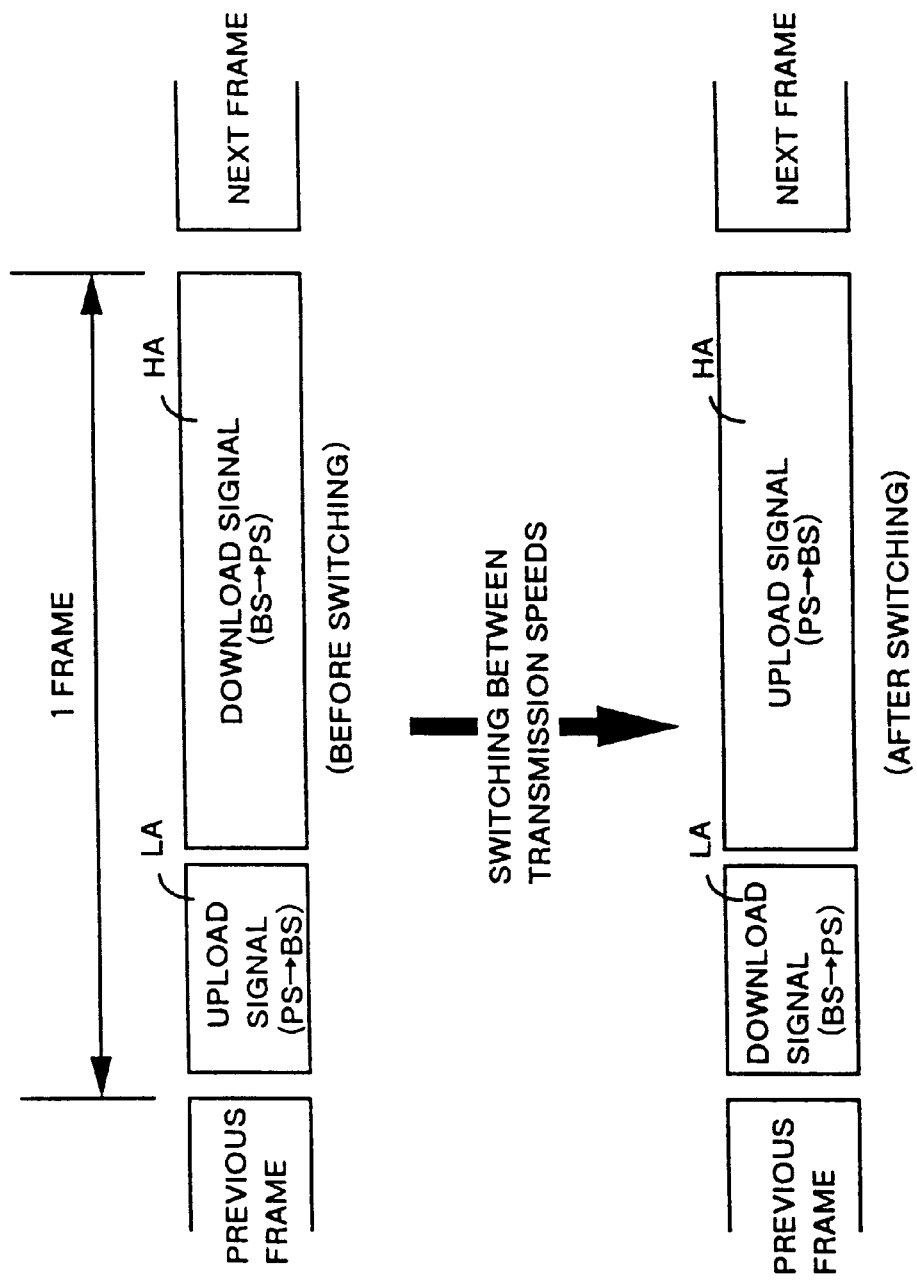

RADIO COMMUNICATION SYSTEM

FIELD OF THE INVENTION

The present invention relates to a radio communication system, and more particularly to a radio communication system for setting a radio channel for time-division multiplex communications between first and second communication devices by making transmission speed allocated to a first-directional signal imbalanced with that allocated to a second-directional signal within one frame.

BACKGROUND OF THE INVENTION

In recent years, there has been proposed a radio communication system for executing balanced transmission by balancing transmission speed for uploading with that for downloading between a base station and a personal station by employing a TDMA (Time Division Multiple Access)/TDD (Time Division Duplex communication) system.

In this radio communication system, in a case where a large quantity of data is transmitted from a transmitting side to a receiving side between a base station and a personal station (the personal station includes a personal station, and so forth), the receiving side transmits data of no use back to the transmitting side during reception of the data.

As described above, there is displacement between a balanced transmission speed allocated to uploading and to downloading respectively and a transmission speed suited to data actually transmitted for uploading or for downloading, so that efficiency of utilization in the identical frequency is reduced.

A similar technology to solve the problem described above is disclosed, for instance, in Japanese Patent Laid-Open Publication No. HEI 1-30527. In this publication is disclosed a radio communication system for switching to imbalanced transmission if there is a request for making a transmission speed for uploading imbalanced with that for downloading between a base station and a personal station during balanced transmission of data.

In a radio communication system based on the conventional technology, complicated configuration for controls is required to improve the efficiency in utilizing an identical frequency, so that configuration of the entire system and a processing sequence for transmission between a base station and a personal station become complicated, which reduces transmission efficiency.

Also, in this type of radio communication system based on the conventional technology, a binary counter has generally been applied to regeneration of a clock in each of the transmission areas in the time domain. In this case, when the number of clock signals become large in one frame due to high speed transmission, a large number of counter stages should be set therein according to the number of clock signals. For this reason, circuit scale becomes larger in some cases, and operating speed will be restricted in association with increase of circuit scale, which causes increase in power consumption.

SUMMARY OF THE INVENTION

It is a first object of the present invention to obtain a radio communication system in which each signal transmission for uploading as well as for downloading can be realized at an optimal transmission speed as required by enhancing transmission efficiency according to its simple configuration and also to a simple transmitting sequence with a different approach from that in the technology disclosed in the publication described above.

In addition to the first object of the present invention described above, it is a second object of the present invention to obtain a radio communication system in which high-speed processing can be achieved with a simplified circuit for executing synchronization capture for each of a high speed- and a low speed transmission area, and with this feature, power consumption can be suppressed.

With an invention according to the present invention, two different types of transmission speed are allocated to a first-directional signal and to a second-directional signal within one frame in which transmission speed is imbalanced with the other. Thus, transmission efficiency can be enhanced with a simple configuration as well as with a simple transmission sequence. With this feature it is possible to realize signal transmission for uploading and for downloading each at an optimal transmission speed as required.

With an invention according to the present invention, in a case where a setting change request signal is set from either one of a first and a second communication devices, by only exchanging an order of the first-directional signal and that of the second-directional signal with each other in the time domain within one frame in which a transmission speed is imbalanced, two different types of transmission speed allocated to the first-directional signal and to the second-directional signal respectively are exchanged with each other within one frame. Hence, transmission efficiency can be enhanced with a simple configuration as well as with a simple transmission sequence. With this feature it is possible to realize signal transmission for uploading and for downloading each at an optimal transmission speed as required.

With an invention according to the present invention, in a case where a setting change request signal is set from either one of the first and the second communication devices, by only exchanging an order of transmission area with that of the other having a different transmission speed allocated thereto in the time domain within one frame in which a transmission speed is different from the other, two different types of transmission speed allocated to the first-directional signal and to the second-directional signal are exchanged with each other within one frame. Hence, transmission efficiency can be enhanced with a simple configuration as well as with a simple transmission sequence. With this feature it is possible to realize signal transmission for uploading and for downloading each at an optimal transmission speed as required.

With an invention according to the present invention, by setting a setting change request signal from either one of the first and the second communication devices, correspondence between the first and second transmission areas and the first-and second-directional signals are repeatedly switched for each frame in the time domain within one frame. Hence, in a case where a transmission speed is changed for each frame, by setting a setting change request signal once, work load required for setting the signal each time can be omitted, which makes it possible to improve operability.

With an invention according to the present invention, the switching described above is executed by counting a number of frames, so that the operation for switching can easily be realized with software, and with this feature expansion of circuit scale can be prevented.

With an invention according to the present invention, the switching described above is executed at a point in time when a frame according to a given frame number is transferred between the first and second communication devices, so that operation for switching can easily be realized with software, and with this feature expansion of the circuit scale can be prevented.

With an invention according to the present invention, synchronization capture for the high-speed transmission area as well as for the low-speed transmission area is executed for each of frames each having imbalanced transmission speed in which the high-speed transmission area and low-speed transmission area are time-divided according to the specified ratio. Transmission areas each having a different transmission speed are allocated to the first-directional signal and the second-directional signal. When synchronization capture is executed, a number of types of frame configuration time-divided according to the specified ratio can be suppressed to a minimum level as required. For this reason, the circuit can be simplified, and processing required for synchronization capture can be executed at a higher speed in accordance with the circuit configuration simplified, so that power consumption can be suppressed.

With an invention according to the present invention, the specified ratio is set to a relation of $(2^N-2)$ vs 1, and a linear shift register for generating the M series is applied, so that the circuit can be simplified, and processing required for synchronization capture can be executed at a higher speed in accordance with the circuit configuration simplified. With this feature power consumption can be suppressed.

Other objects and features of this invention will become understood from the following description with reference to the accompanying drawings.

BRIEF DESCRIPTION OF THE DRAWINGS

FIG. 1 is a view showing frame configuration applied to time-division multiplex communications according to one embodiment of the present invention;

FIG. 2A is a view showing a download frame within one frame and FIG. 2B is a view showing an uploaded frame within one frame;

FIG. 3 is a view showing frame configuration before and after switching between transmission speeds according to the first embodiment of the present invention;

DESCRIPTION OF THE PREFERRED EMBODIMENTS

Detailed description is made hereinafter for preferred embodiments of the present invention with reference to the related drawings.

At first, description is made for a frame form of the radio communication system according to Embodiment 1.

FIG. 1 is a view showing frame configuration applied to time-division multiplex communications according to Embodiment 1 of the present invention.

In the radio communication system, as shown in FIG. 1, transmission speeds imbalanced with each other are allocated to an upload signal (from a PS (a personal station) to a BS (a base station)) as the first-directional signal and to a download signal (from a BS to a PS) as the second-directional signal each within one frame in which a transmission speed is imbalanced, and time-division multiplex communications based on one vs one TDD system is executed.

The frame shown in FIG. 1 has a configuration in which in upload signal and a download signal are arranged in the time domain in the order of the upload signal and download signal. A low-speed transmission area LA for executing low speed transmission is allocated to the upload signal, while a high-speed transmission area HA for executing high speed transmission at a speed higher than the low speed transmission is allocated to the download signal.

For each frame, the low-speed transmission area LA and the high-speed transmission area HA are time-divided according to a specified ratio, and each synchronization capture for the low-speed transmission area LA and high-speed transmission area HA is executed according to the ratio.

As for the specified ratio, relation between a low-speed transmission area LA and a high-speed transmission area HA can be set to, for instance, $1:(2^N-2)$. For this reason, assuming that a period of time required for the low-speed transmission area LA is T (second), a period of time required for the high-speed transmission area HA is $T \times (2^N-2)$ (second).

In a case where the specified ratio described above is set, the sum of the ratio of the low-speed transmission area LA and that of the high-speed transmission area HA is $2^N-1$, and in this case, the M series can be provided. By regenerating a clock signal in the receiving side, as shown in FIG. 1, by making use of this M series, a frame pulse for switching between the low-speed transmission area LA and the high-speed transmission area HA can be obtained. In this frame pulse, a low-speed transmission area LA is transmitted when a level is high, while a high-speed transmission area HA is transmitted when a level is low.

Figure 2A:
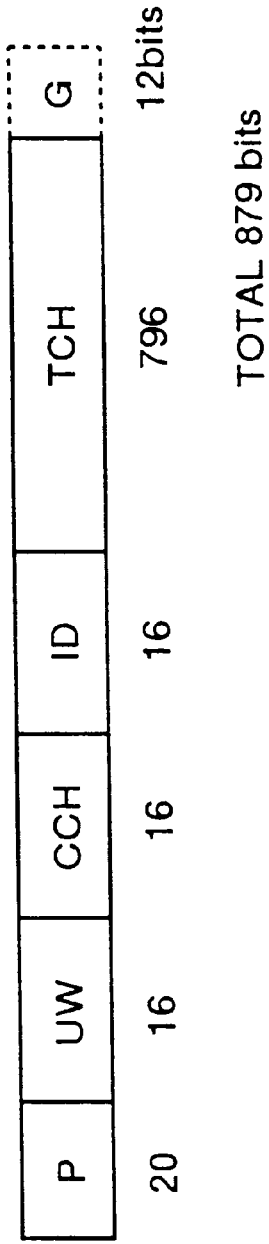
FIGS. 2A and 2B are views showing frame configuration according to the first embodiment of the present invention.
Figure 2B:
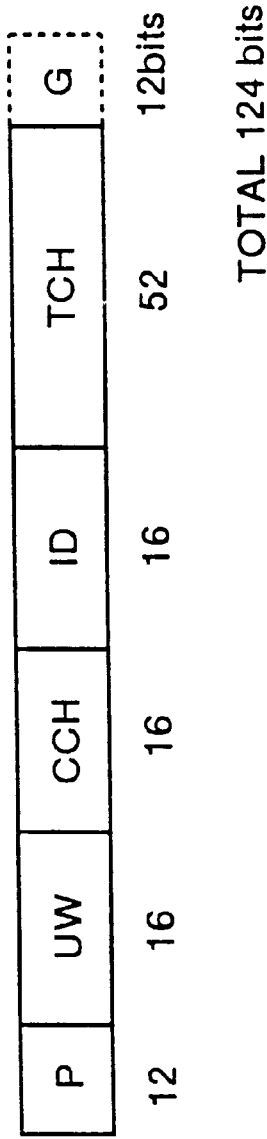

FIGS. 2A and 2B are views showing frame configuration, FIG. 2A shows a download frame within one frame, and FIG. 2B shows an upload frame within one frame. In FIGS. 2A and 2B, a preamble (P) stores therein data for synchronization of a clock, and a unique word (UW) stores therein data for various types of synchronization. A control channel (CCH) stores therein control signals such as high speed transmission request commands (a file transfer request command, an image transmission request command, and an aural transmission request command or the like) described later. A data channel (TCH) stores therein user data such as a voice or the like, and a guard bit (G) stores therein data for absorbing a synchronization control error.

The download frame comprises, like the example shown in FIG. 2A, the preamble (P) composed of 20 bits, unique word (UW) composed of 16 bits, control channel (CCH) composed of 16 bits, identification code (ID) composed of 16 bits, data channel (TCH) composed of 796 bits, and guard bits (G) composed of 12 bits.

The upload frame comprises, as in the example shown in FIG. 2B, the preamble (P) composed of 12 bits, unique word (UW) composed of 16 bits, control channel (CCH) composed of 16 bits, identification code (ID) composed of 16 bits, data channel (TCH) composed of 52 bits, and guard bits (G) composed of 12 bits.

As described above, the total of a number of bits from the preamble (P) to the identification code (ID) and the number of bits of the guard bits (G) in the down load frame are made equal to that in the upload frame, and the quantity of data is differentiated by a number of bits for the data channel (TCH) in each frame.

For this reason, in Embodiment 1, correspondence between the transmission areas allocated to the upload signal and to a download signal is changed for a base station and for a personal station respectively so that a station transmitting data having therein a large quantity of information such as file data, image data, and speech data or the like can preferentially use a high-speed transmission area HA.

Next description is made for a principle of switching between transmission speeds. FIG. 3 is a view showing frame configuration before and after the switching between transmission speeds.

At first, in the frame before the switching, as in a frame state shown in FIG. 1, the upload frame and download frame are arranged in the direction of the time axis, and constitute a low-speed transmission area LA and a high-speed transmission area HA respectively. Namely, a base station can preferentially use the high-speed transmission area HA so that data having a large quantity of information therein can be transmitted thereby.

In contrast, in the frame after the switching, the frame configuration in which the low-speed transmission area LA and the high-speed transmission area HA are arranged in the direction of the time axis is maintained as is, but the order of the upload frame and that of the download frame are exchanged in the time domain. As a result, a personal station is switched to a state in which the personal station can preferentially use the high-speed transmission area HA to transmit a large quantity of data.

Figure 4:
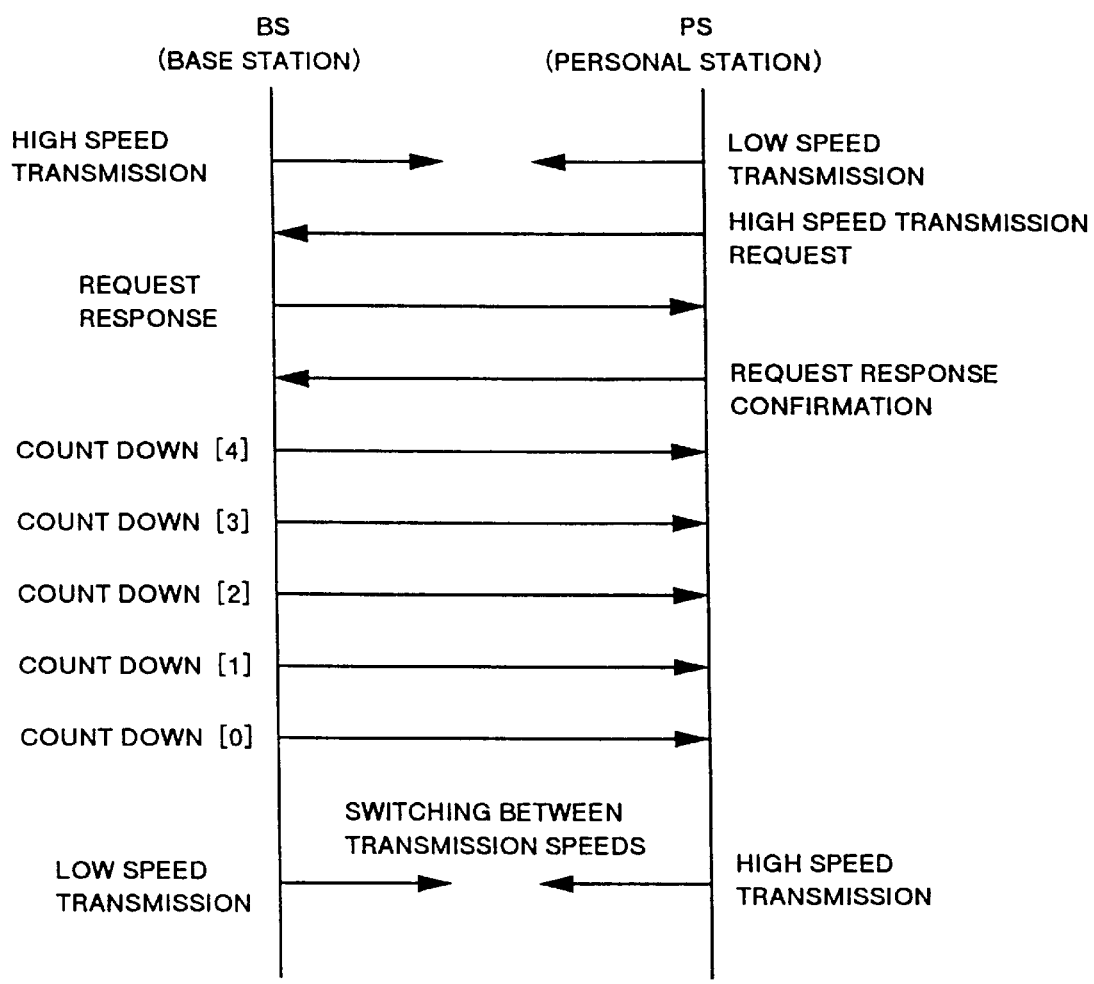
FIG. 4 is a view for explanation of timing for switching between the transmission speeds in Embodiment 1 of the present invention.

Further description is made for timing for the switching between transmission speeds. FIG. 4 is a view for explanation of timing for switching between the transmission speeds in Embodiment 1. For example, as shown in FIG. 4, it is assumed for convenience in the following description that a base station is executing high speed transmission according to preference for the high speed transmission, and a personal station is executing low speed transmission at a current point in time.

During the execution described above, in a case where the personal station transmits, for instance, file data, image data, or speech data to the base station, at first, the personal station issues a high speed transmission request to the base station. This high speed transmission request is stored in the control channel (CCH) within the upload frame shown in FIG. 2B as command data.

When the base station reads out the command data from the upload frame described above and permits the high speed transmission request indicated by the command data to the personal station, a response thereto is stored in the control channel (CCH) within the download frame shown in FIG. 2A as response data.

Then, in a case where the personal station reads out the response data from the download frame described above, and confirms the contents of permission indicated by the response data, the confirmation of the response is stored in the control channel (CCH) within the upload frame as response confirmation data to transmit the response confirmation back to the base station again.

As described above, when the base station receives the response confirmation data, it in turn sends out count-down signals to the control channel (CCH) within the download frame of the personal station in the order of values of "14", "3", "2", "1", and "0" each time when one frame is transferred thereto.

When a frame storing therein a count-down signal "0" is transmitted, the switching between transmission speeds is executed before the following frame is transmitted. Namely, as shown in FIG. 3, the frame configuration in which the low speed transmission area LA and high speed transmission area HA are arranged in the direction of the time axis is maintained as is, but the order of the upload frame and that of the download frame are exchanged in the time domain. For this reason, preference on high speed transmission is shifted to the personal station, so that the personal station starts high speed transmission, while the base station starts low speed transmission. Namely, setting of high speed transmission is changed, so that a high speed transmission request functions as a setting change request.

Figure 5:
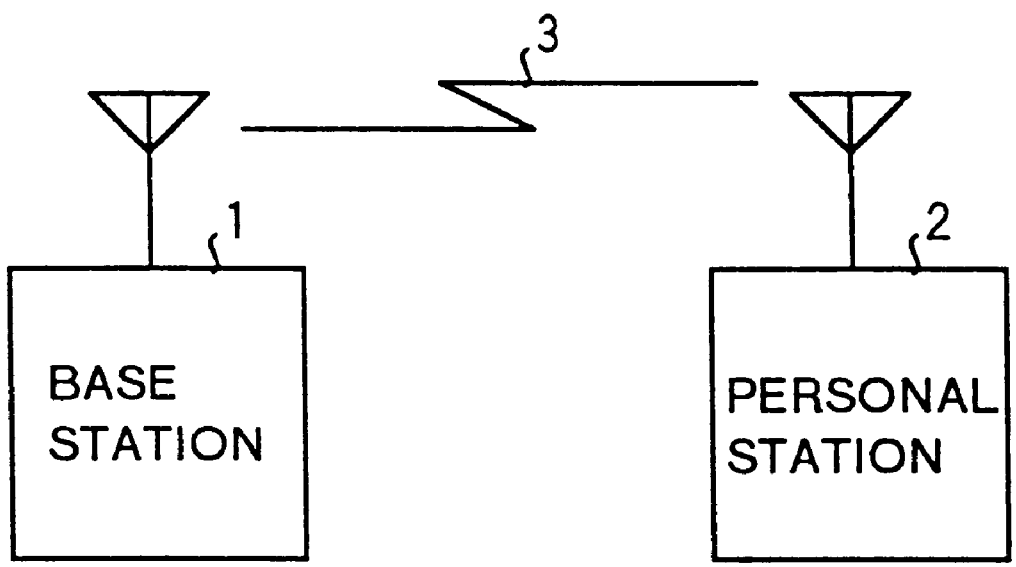
FIG. 5 is a view showing configuration of the radio communication system according to the first embodiment of the present invention.

Next, a description is made for the system configuration. FIG. 5 is a block diagram showing the radio communication system according to Embodiment 1 of the present invention. The radio communication system shown in the figure comprises a base station 1 and a personal station 2, and a radio link 3 is formed between the base station 1 and the personal station 2 for executing communications therebetween.

Figure 6:
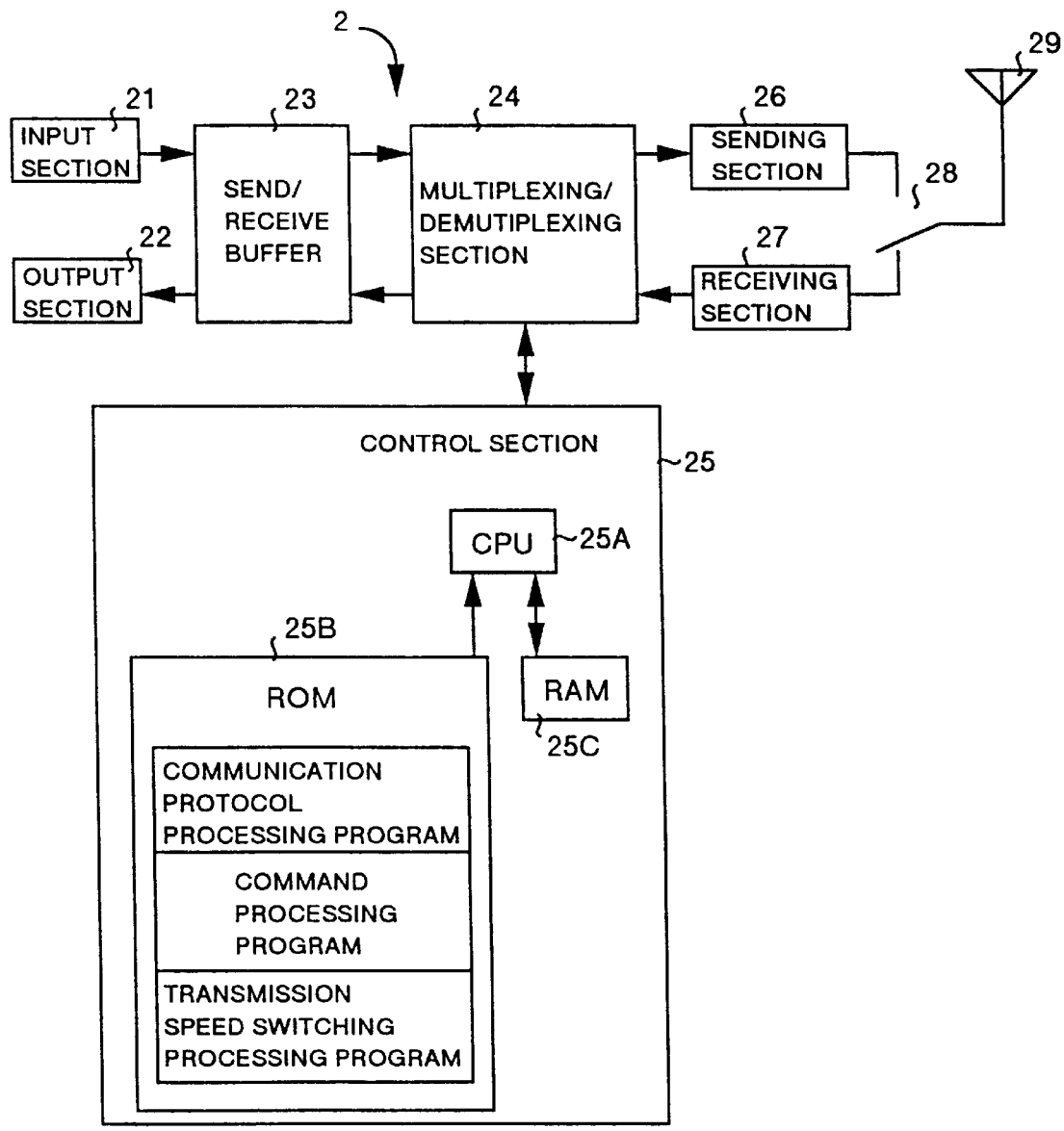
FIG. 6 is a block diagram showing typical internal configuration of a station constituting the radio communication system shown in FIG. 5

FIG. 6 is a view showing typical internal configuration of a station constituting the radio communication system shown in FIG. 5. In this figure, the internal configuration of a personal station 2 is illustrated as a typical example.

The personal station 2 comprises, for instance, an input section 21, an output section 22, a transmitting/receiving buffer 23, a multiplexing demultiplexing section 24, a control section 25, a transmitting section 26, a receiving section 27, a transmission/reception switching section 28, and an antenna section 29.

The input section 21 is connected to the transmitting/receiving buffer 23, and supplies transmitted data received from external equipment such as a key-entry device or a communication device or the like each not shown herein to the transmitting/receiving buffer 23. The output section 22 is connected to the transmitting/receiving buffer 23, and when the receive data is supplied thereto from the transmitting/receiving buffer 23, the output section 22 outputs the data to external equipment such as a display unit, a printing device, and a communication device or the like each not shown herein.

The transmitting/receiving buffer 23 is connected to the input section 21, output section 22, and multiplexing/demultiplexing section 24, and framed transmitted/received data is transmitted to and received from each of the sections.

The multiplexing/demultiplexing section 24 is connected to the transmitting/receiving buffer 23, control section 25, transmitting section 26, and receiving section 27, and according to control by the control section 25 it multiplexes the transmission data received from the transmitting/receiving buffer 23 and outputs the data to the transmitting section 26, or demultiplexes the receive data (multiplexed data) received from the receiving section 27 and outputs the demultiplexed data to the transmitting/receiving buffer 23.

The control section 25 comprises a CPU 25A, a ROM 25B, and RAM 25C, and controls the entire personal station 2. The CPU 25A executes communication control with the base station 1 and switching control between transmission speeds according to control programs such as communication protocol processing, command processing, and transmission speed switching processing or the like each stored in the ROM 25B.

Figure 8:
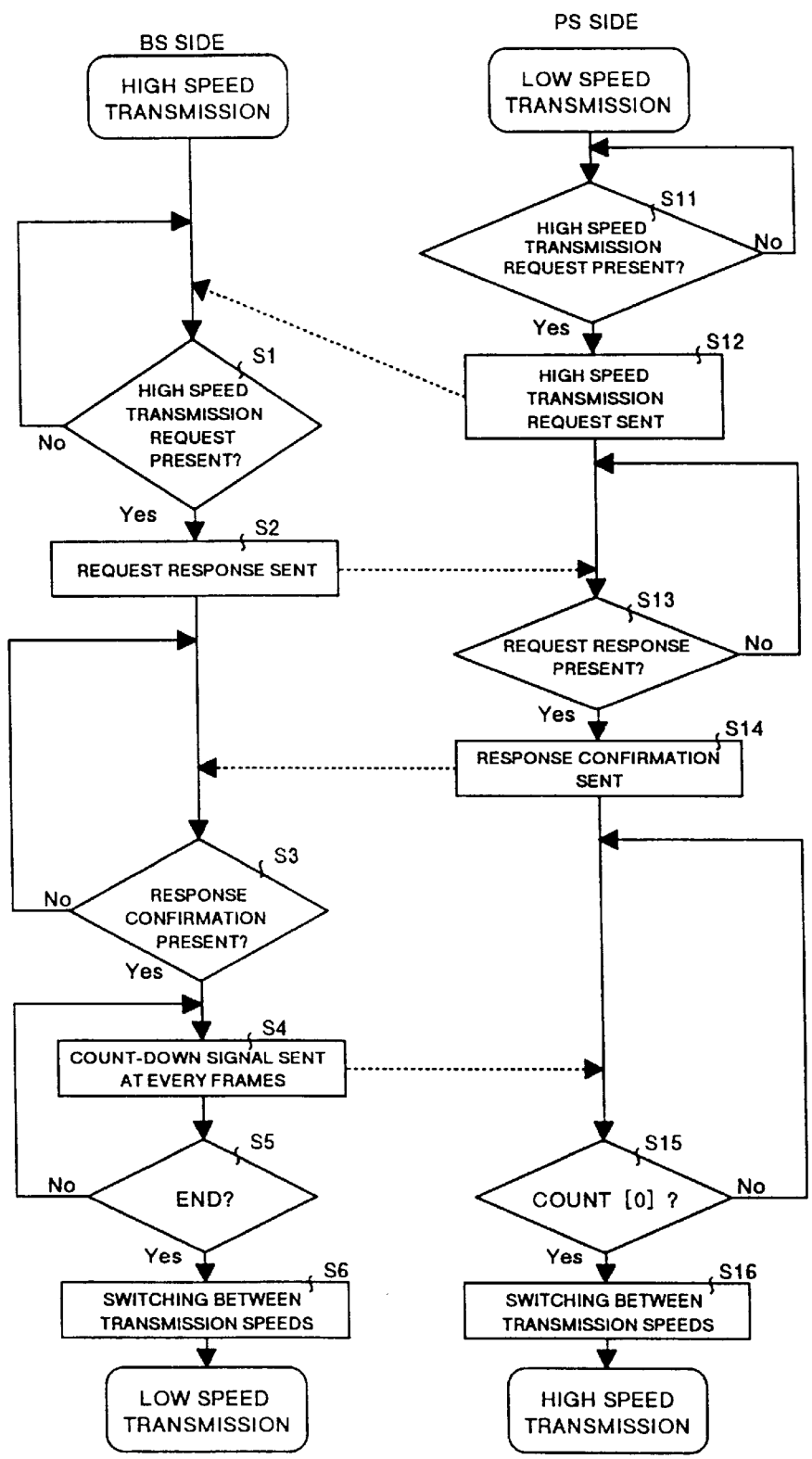
FIG. 8 is a flow chart for explanation of operations for transmission between a base station 1 and a personal station 2 according to the first embodiment.

The processing flow for this switching control is described below, but the details are shown in FIG. 8. The RAM 25C is used as a work area when various types of control program are executed.

The transmitting section 26 is connected to the multiplexing/demultiplexing section 24 as well as to transmission/reception switching section 28, modulates the multiplexed transmission data from the multiplexing/demultiplexing section 28 and outputs the data to the transmission/reception switching section 26. The receiving section 27 is connected to the multiplexing/demultiplexing section 24 as well as to the transmission/reception switching section 28, demodulates the receive data from the transmission/reception switching section 28 and outputs the data to the multiplexing/demultiplexing section 24.

The transmission/reception switching section 28 switches according to each of the areas for an upload signal and a download signal within one frame to the transmitting section 26 in a case where data is transmitted as a upload signal, and to the receiving section 27 in a case where data is received as a download signal. The antenna 29 transmits the modulated signal sent from the transmitting section 26 to the base station 1 as radio wave when transmitting signals, while the antenna 29 catches incoming radio wave from the base station 1 and outputs the modulated signal to the receiving section 27 in the transmission/reception switching section 28.

In Embodiment 1, as already described in the section on the principle of switching, the M series can be used, so that the linear shift register generating the M series can be applied to decoder in the receiving section 27.

Figure 7:
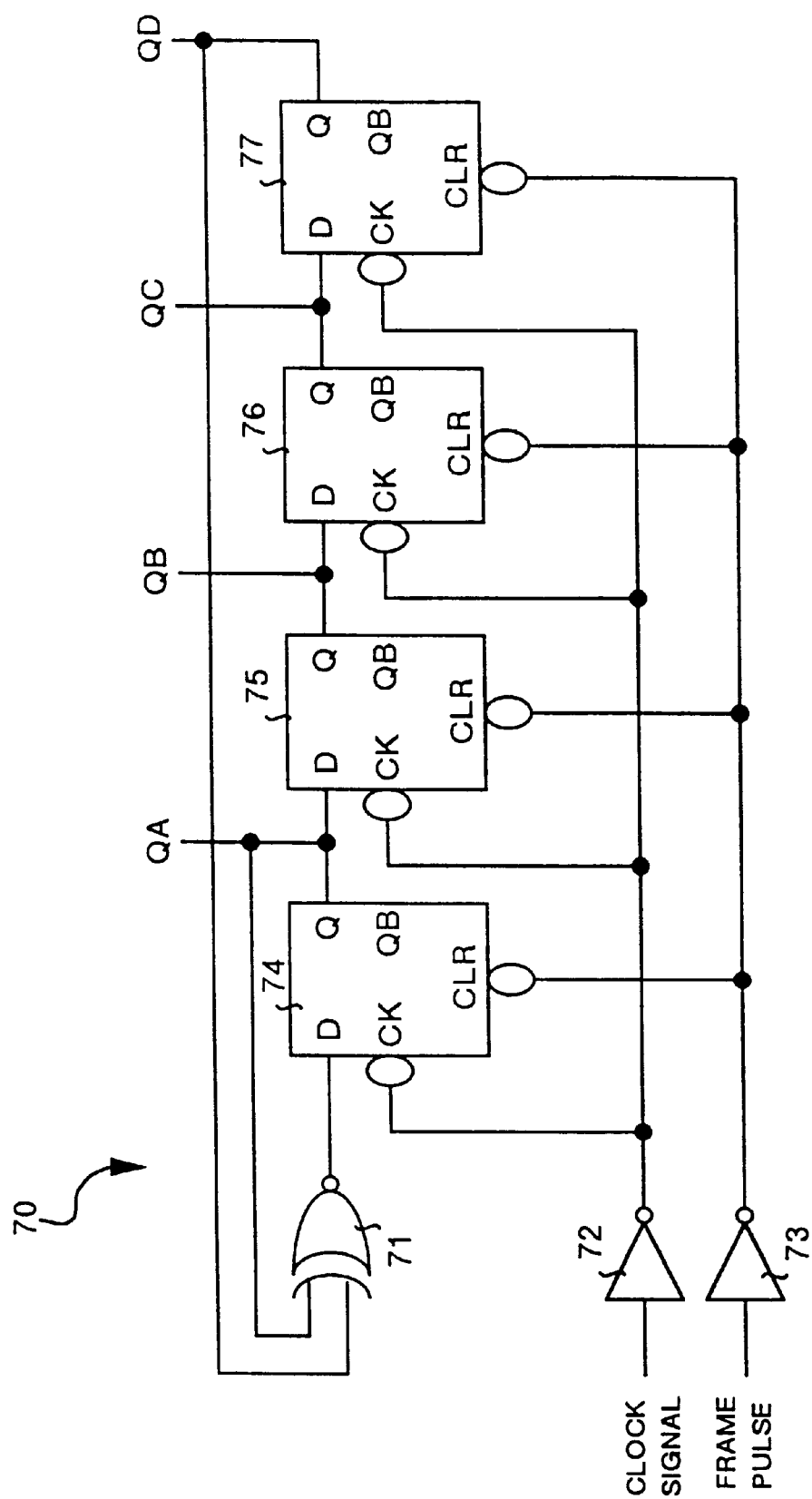
FIG. 7 is a circuit diagram showing an example of the linear shift register applied in the first embodiment.

FIG. 7 is a circuit diagram showing an example of the linear shift register according to Embodiment 1, and in the figure, the reference numeral 70 indicates the linear shift register. This linear shift register 70 comprises an E (exclusive) NOR circuit 71, NOT circuits 72, 73, and four-stage D flip flops 74 to 77. The linear shift register 70 fetches clock signals and frame pulses (reset signals) thereinto via the NOT circuits 72 and 73 respectively, and starts counting.

Namely, the D flip flops 74, 75, 76, and 77 are reset upon input of a frame pulse, and data from a low speed transmission area LA or a high speed transmission area HA is synchronized to a clock signal and is fetched thereinto. Outputs QA, QB, QC, and QD are outputted from the D flip flops 74, 75, 76, and 77 respectively according to the clock synchronization.

In Embodiment 1, this four-stage linear shift register 70 is employed as an example, so that the high speed transmission area HA has a time band $(2^4-2)$ times longer compared to that of the low speed transmission area LA.

Next, a description is made for operations. FIG. 8 is a flow chart for explanation of an operation for transmission between the base station 1 and personal station 2 according to Embodiment 1.

At first, as in the description for FIG. 4, it is assumed that the base station 1 is executing high speed transmission according to preference on high speed transmission, and the personal station 2 is executing low speed transmission at a current point of time. During the operation, in the personal station 2, when a file transfer request command is received thereby, the control section 25 confirms the command for a high speed transmission request from the file transfer request command (step S11), and sets file transfer request command data in the upload frame.

Then, the personal station 2 requests high speed transmission by transmitting the upload frame described above to the base station 1 (step S12).

The base station 1 reads out the command data from the upload frame described above, and confirms contents of thee command. In this case, the command is a file transfer request, so that determination is made as to whether it is a high speed transmission request or not (step S1).

In a case where the base station 1 gives permission of the high speed transmission request (file transfer request) to the personal station 2, the base station 1 sets the response data in a download frame, and transmits the frame to the personal station 2 (step S2).

In a case where the personal station 2 reads out the response data from the download frame described above and confirms contents of the permission indicated by the response data (step S13), the personal station 2 sets the response confirmation data in an upload frame to transmit the response confirmation to the base station 1 again. Then the upload frame is transmitted to the base station 1.

When the base station 1 receives the response confirmation data (step S3), it sends out count-down signals to the control channel (CCH) within the download frame of the personal station 2 in the order of values as "4", "3", "2", "1", "0" each time when one frame is transferred thereto (step S4).

When the frame storing therein the last count-down signal "0" is transmitted (step S5), switching between the transmission speeds is executed before the following frame is transmitted because receiving of the following frame is a timing (a starting point) for the switching (step S6). Also in the personal station 2, when the count-down signal "0" reaches from the base station 1 (step S15), switching between the transmission speeds is executed before the following frame is received because receiving of the following frame is a timing (a starting point) for the switching (step S16).

Namely, as shown in FIG. 3, the frame configuration in which the low speed transmission area LA and high speed transmission area HA are arranged in the direction of the time axis is maintained as is, but the order of the upload frame and that of the download frame are exchanged in the time domain. For this reason, preference on high speed transmission is shifted to the personal station 2, so that the personal station 2 starts high speed transmission, while the base station 1 starts low speed transmission.

As described above, with Embodiment 1, two different types of transmission speed allocated to an upload signal and to a download signal are resultantly exchanged within one frame according to a high speed transmission request (command) set in a frame, so that a transmission efficiency can be enhanced with simple configuration as well as with a simple transmission sequence. With this feature, signal transmission for uploading and downloading can be realized each at an optimal transmission speed as required.

Timing for the switching is decided by counting a number of frames, so that switching can easily be realized with software, and with this feature expansion of circuit scale can be prevented.

Synchronization capture for the high-speed transmission area and the low-speed transmission area is executed according to each of the frames in which the high-speed transmission area and low-speed transmission area are time-divided according to a specified ratio and also transmission areas each having a different transmission speed are allocated to an upload signal and a download signal. Hence, when synchronization capture is executed, a number of types of frame configuration time-divided according to the specified ratio can be suppressed to the required minimum level.

Especially, the specified ratio is set to a relation of $(2_N-2)$ vs 1, and a linear shift register for generating the M series is applied thereto, so that a circuit can be simplified as compared to a binary counter generally used, and the processing required for synchronization capture can be executed at a higher speed since complicated carry-bit computing is not required because of the simple circuit configuration or for other reasons, and with this feature power consumption can be suppressed.

In Embodiment 1 described above, a high speed transmission request is made from a station requesting switching from the low speed transmission which is executed at a current point of time thereby to the high speed transmission in the base station 1 or personal station 2. However, system control may automatically return to the original transmission speed allocation just after a required transmission of data such as files, images, voices or the like is completed after the high speed transmission request is made.

In Embodiment 1 described above, timing for switching between transmission speeds can be decided by counting frames transmitted between stations. However, as in Embodiment 2 described below, switching between transmission speeds may be executed by freely specifying a frame number of a frame to be switched.

The radio communication system according to Embodiment 2 has the same configuration as that in Embodiment 1 described above, so that description of the configuration is omitted herein, and only operations thereof are described herein using the same reference numerals.

Figure 9:
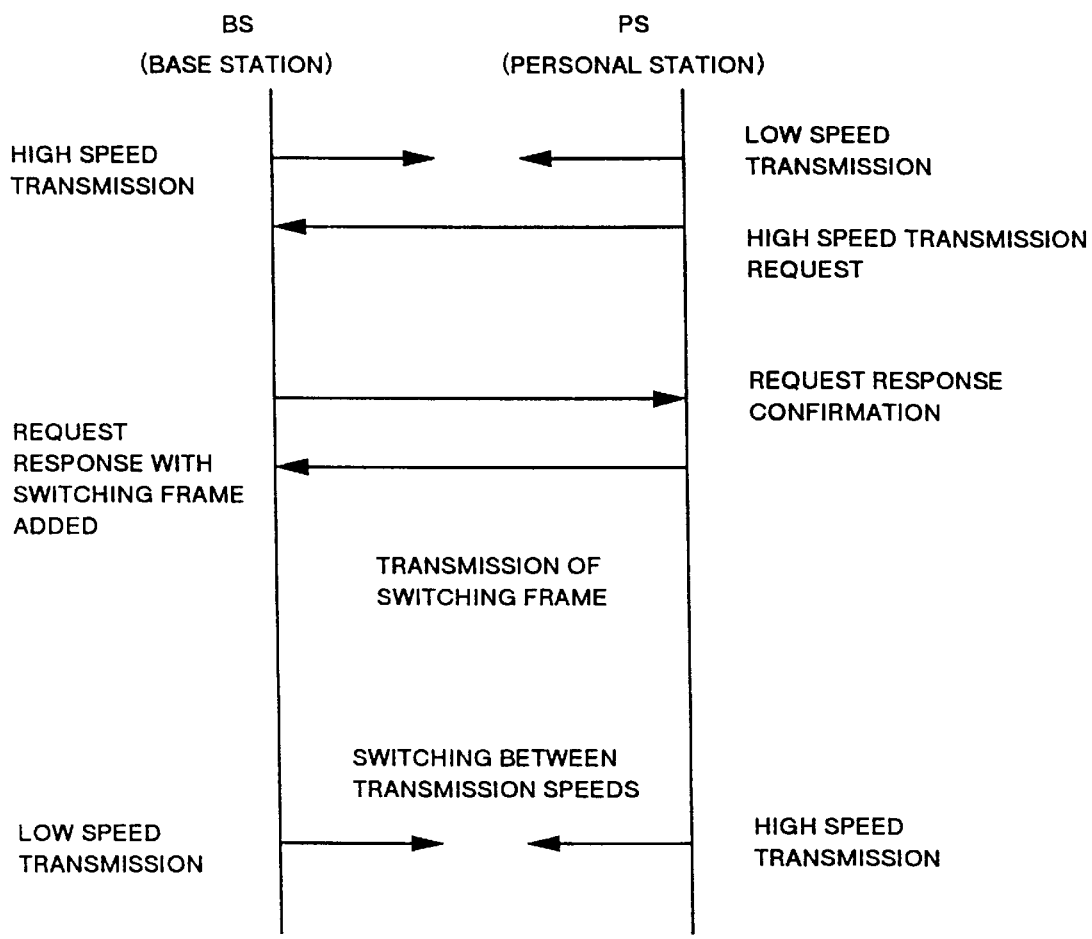
FIG. 9 is a view for explanation of timing for switching between the transmission speeds in the second embodiment.

FIG. 9 is a view showing timing for switching between transmission speeds according to Embodiment 2. As shown in, for instance, FIG. 9, it is assumed for convenience in the following description that the base station 1 is executing high speed transmission according to preference on high speed transmission, and the personal station 2 is executing low speed transmission at a current point of time.

During the operations, in a case where the personal station 2 transmits, for instance, file data, image data, or speech data to the base station 1, at first the personal station 2 sets a request command in an upload frame to the base station 1, and transmits a high speed transmission request thereto.

In a case where the base station 1 gives permission of the high speed transmission request to the personal station 2 according to the command set in the upload frame, in order to respond to the request, the base station 1 adds data for switching frame number to the response data in the control channel (CCH) of a download frame as switching frame number for starting exchanging it with a frame number transmitted later than the current frame.

In a case where the personal station 2 reads out the response data from the download frame described above and confirms contents of the permission indicated by the response data, the personal station 2 further reads out a frame number of the frame to be switched added to the response data, and is prepared for switching. Then, to transmit the response confirmation back again to the base station 1, the response confirmation data is set in an upload frame and transmitted thereto.

As described above, when the base station 1 receives the response confirmation data, both the base station 1 and personal station 2 execute switching between the transmission speeds after the frame for switching frame number is transmitted and before the following frame is transmitted.

When switching between transmission speeds is executed as described above, the frame configuration in which the low speed transmission area LA and high speed transmission area HA are arranged in the direction of the time axis is maintained as is, but the order of the upload frame and that of the download frame are exchanged in the time domain. For this reason, preference on high speed transmission is shifted to the personal station 2, so that, as shown in FIG. 9, the personal station 2 starts high speed transmission, while the base station 1 starts low speed transmission.

As described above, with Embodiment 2, timing for the switching is decided according to a point in time when a frame having a given frame number is transmitted, so that switching operations can easily be realized with software, and with this feature expansion of circuit scale can be prevented.

In Embodiments 1, 2 described above, switching between transmission speeds is executed by exchanging the order of an upload signal and that of a download signal with each other in the time domain within one frame. However, as in Embodiment 3 described below, the switching between a low speed transmission area and a high speed transmission area may be executed in the time domain within one frame.

The radio communication system according to Embodiment 3 has the same configuration as that in Embodiment 1 described above, so that description of the configuration is omitted herein, and only operations thereof are described herein using the same reference numerals.

Figure 10:
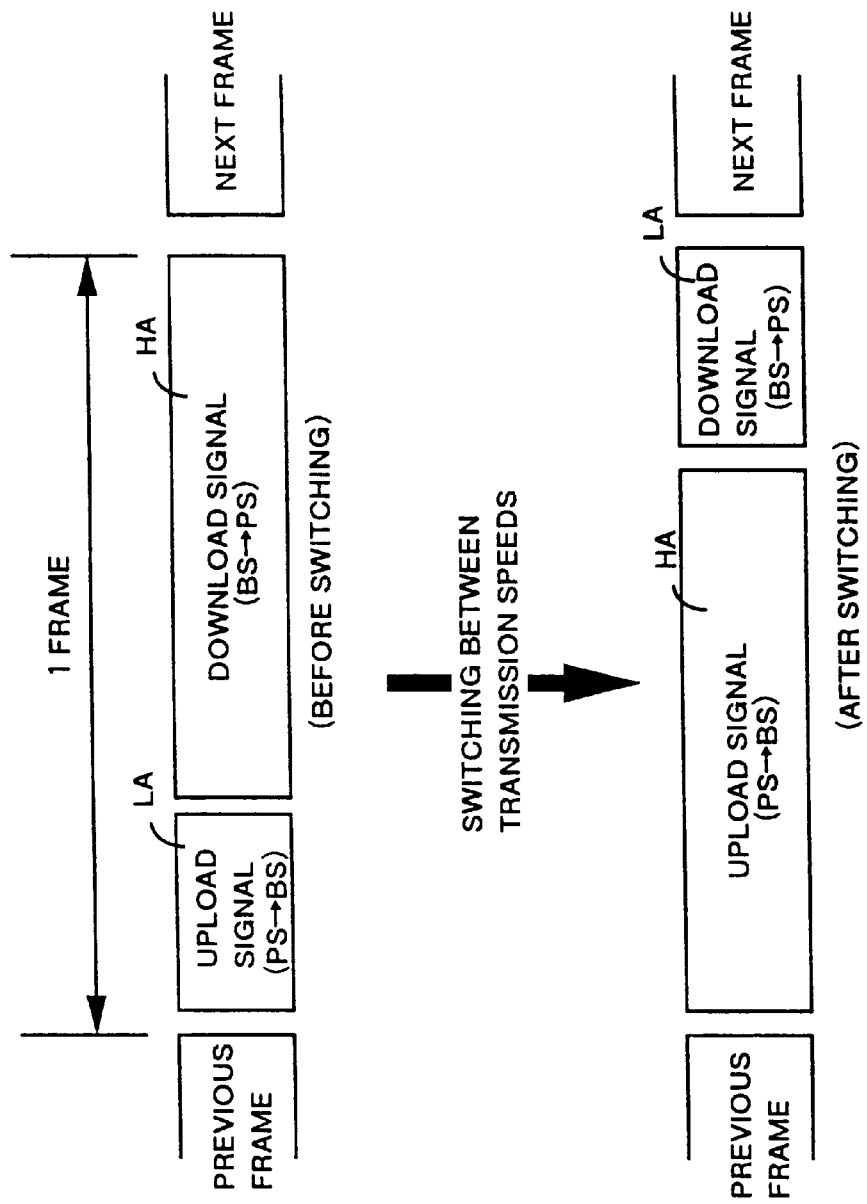
FIG. 10 is a view showing frame configuration before and after switching between transmission speeds according to the third embodiment.

FIG. 10 is a view showing frame configuration before and after the switching between transmission speeds according to Embodiment 3. At first, in the frame before the switching, as in a frame state shown in FIG. 1, the upload frame and download frame are arranged in the direction of the time axis, and constitute a low-speed transmission area LA and a high-speed transmission area HA respectively. Namely, a base station can preferentially use the high-speed transmission area HA to transmit a large quantity of data.

In contrast, after the switching, the order of the upload frame and that of the download frame in a direction of the time axis are maintained as is, but the low-speed transmission area LA and the high-speed transmission area HA are exchanged with each other in the time domain. As a result, a personal station 2 is changed to a state in which the station can preferentially use the high-speed transmission area HA to transmit a large quantity of data thereby.

As described above, with Embodiment 3, two different types of transmission speed allocated to an upload signal and to a download signal respectively are exchanged with each other within one frame by exchanging transmission areas having different transmission speeds within one frame with each other according to a high speed transmission request (command) set in the frame. Hence, the transmission efficiency can be enhanced with a simple configuration as well as a simple transmission sequence, and with this feature signal transmission for uploading and downloading can be realized each at an optimal transmission speed as required.

It should be noted that, also in Embodiment 3, timing for the switching may be decided according to a point in time when a frame having a given specified frame number is transmitted.

In any of Embodiments 1 to 3, switching between transmission speeds is executed, for each high speed transmission request, and system control returns to the original transmission speed after transmission of a specified transmission frame is completed. But as in Embodiment 4 described below, switching between transmission speeds may be executed for each frame according to each high speed transmission request.

The radio communication system according to Embodiment 4 has the same configuration as that in Embodiment 1 described above, so that description of the configuration is omitted herein, and only operations thereof are described herein using the same reference numerals.

Figure 11:
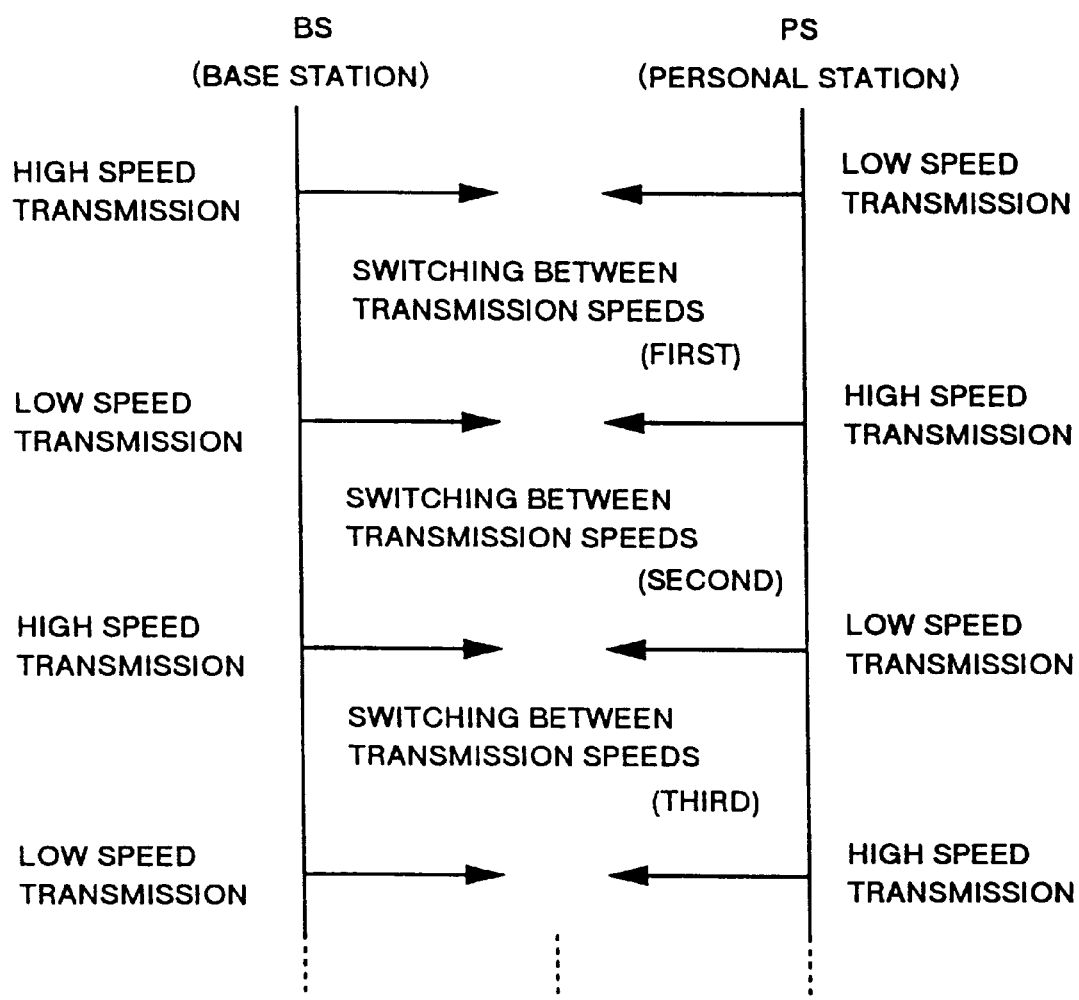
FIG. 11 is a view for explanation of timing for switching between the transmission speeds in the fourth embodiment.

FIG. 11 is a view showing timing for switching of transmission speeds in Embodiment 4. Also in embodiment 4, as in Embodiment 1 or in Embodiment 2, timing for first switching between transmission speeds is decided by counting down or by using switching frame number.

After the switching, the control section 25 switches the transmission speeds to each other for preparing the following frame transmission as shown in FIG. 11. Similarly from this step and on, switching between transmission speeds is executed for each frame according to control provided by the control section 25.

As described above, with Embodiment 4, a high speed transmission request (command) is set in a frame, and the high speed transmission area and low speed transmission area are repeatedly switched for each frame in the time domain within one frame. Hence, in a case where transmission speeds are switched for each frame, by setting a high speed transmission request in a frame once, work load required each time for setting a high speed transmission request therein can be reduced, and the operability can be improved.

As described above, with the radio communication system according to the present invention, two different types of transmission speed are allocated to the first-directional signal and to the second-directional signal respectively within one frame in which a transmission speed is imbalanced with the other. Transmission efficiency thus can be enhanced with simple configuration as well as with a simple transmission sequence, and with this feature it is possible to obtain a radio communication system in which signal transmission for uploading and downloading can be realized each at an optimal transmission speed as required.

With the radio communication system according to the present invention, in a case where a setting change request signal is set from either one of the first and second communication devices, by only exchanging the order of the first-directional signal and that of the second-directional signal with each other in the time domain within one frame in which a transmission speed is imbalanced with the other, two different types of transmission speed allocated to the first-directional signal and to the second-directional signal are exchanged with each other within one frame. Thus, transmission efficiency can be enhanced with simple configuration as well as with a simple transmission sequence, and with this feature it is possible to obtain a radio communication system in which signal transmission for uploading and for downloading can be realized each at an optimal transmission speed as required.

With the radio communication system according to the present invention, in a case where a setting change request signal is set from either one of the first and the second communication devices, by only exchanging the order of transmission area with that of the other each having a different transmission speed in the time domain within one frame in which a transmission speed is different from the other, two different types of transmission speed allocated to the first-directional signal and to that the second-directional signal are exchanged with each other within one frame. Thus, transmission efficiency can be enhanced with simple configuration as well as with a simple transmission sequence. With this feature, it is possible to obtain a radio communication system in which signal transmission for uploading and for downloading can be realized each at an optimal transmission speed as required.

With the radio communication system according to the present invention, by setting a setting change request signal from either one of the first and the second communication devices, correspondence between the first and second transmission areas and the first- and second-directional signals are switched for each frame in the time domain within one frame. In a case where a transmission speed is exchanged with the other for each frame, by setting a setting change request signal once, work load required each time for setting the signal each time can be reduced, making it possible to obtain a radio communication system in which the operability can be improved.

With the radio communication system according to the present invention, any of the switching described above is decided by counting a number of frames, so that alternate operations can easily be realized with software. With this feature, it is possible to obtain a radio communication system in which expansion of circuit scale can be prevented.

With the radio communication system according to the present invention, the switching described above is executed at a timing when a frame according to a given frame number is transferred. Switching operations can easily be realized with software, and it is possible to obtain a radio communication system in which expansion of circuit scale can be prevented.

With the radio communication system according to the present invention, synchronization capture for the high-speed transmission area and the low-speed transmission area is executed for each frame having an imbalanced transmission speed in which the high-speed transmission area and low-speed transmission area are time-divided according to the specified ratio. Transmission areas each having a different transmission speed are allocated to the first-directional signal and the second-directional signal. When synchronization capture is executed, a number of types of frame configuration time-divided according to the specified ratio can be suppressed to the minimum required level. For this reason, the circuit can be simplified, and processing required for synchronization capture can be executed at a higher speed because of the circuit configuration simplified as described above. It is thus possible to obtain a radio communication system in which power consumption can be suppressed. It should be noted that, in this case also, the transmission efficiency can be enhanced with a simple configuration as well as a simple transmission sequence, so that it is possible to realize signal transmission uploading and for downloading each at an optimal transmission speed as required.

With the radio communication system according to the present invention, the specified ratio is set to a relation of $(2^N-2)$ vs 1, and a linear shift register for generating the M series is applied thereto. The circuit thus can be simplified, and processing required for synchronization capture can be executed at a higher speed because of the circuit configuration simplified as described above. It is now possible to obtain a radio communication system in which power consumption can be suppressed.

This application is based on Japanese patent application No. HEI 8-222894 filed in the Japanese Patent Office on Aug. 23, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. Radio communication system for setting a radio channel for time-division multiplex communications between first and second communication devices by making a transmission speed allocated to a first-dimensional signal transmitted from said first communication device to said second communication device imbalanced with that allocated to a second-directional signal transmitted from said second communication device to said first communication device within one frame; wherein each frame having an imbalanced transmission speed is time-divided to a first transmission area to which a first transmission speed is allocated and to a second transmission area to which a second transmission speed differentiated from said first transmission speed is allocated, either one of said first transmission area or said second transmission area is allocated to said first-directional signal and a remaining one of said first transmission area and said second transmission area is allocated to said second-directional signal within the same frame, wherein, in a case where a setting change request signal is set from either one of said first and second communication devices, correspondence between said first and second transmission areas and said first- and second-directional signals are repeatedly switched for each frame in the time domain within one frame.

2. Radio communication system for setting a radio channel for time-division multiplex communications between first and second communication devices by making a transmission speed allocated to a first-directional signal transmitted from said first communication device to said second communication device imbalanced with that allocated to a second-directional signal transmitted from said second communication device to said first communication device within one frame; wherein each frame having an imbalanced transmission speed is time-divided to a first transmission area to which a first transmission speed is allocated and to a second transmission area to which a second transmission speed differentiated from said first transmission speed is allocated, either one of said first transmission area or said second transmission area is allocated to said first-directional signal and a remaining one of said first transmission area and said second transmission area is allocated to said second-directional signal within the same frame, wherein said setting change request signal includes count data, a number of frames transferred between said first and second communication devices is counted according to said count data, and the switching in the time domain is executed at a timing when a specified count has been reached.

3. Radio communication system for setting a radio channel for time-division multiplex communications between first and second communication devices by making a transmission speed allocated to a first-directional signal transmitted from said first communication device to said second communication device imbalanced with that allocated to a second-directional signal transmitted from said second communication device to said first communication device within one frame; wherein each frame having an imbalanced transmission speed is time-divided to a first transmission area to which a first transmission speed is allocated and to a second transmission area to which a second transmission speed differentiated from said first transmission speed is allocated, either one of said first transmission area or said second transmission area is allocated to said first-directional signal and a remaining one of said first transmission area and said second transmission area is allocated to said second-directional signal within the same frame, wherein said setting change request signal includes given frame number data, and the switching in the time domain is executed at a timing when a frame according to said given frame number is transferred between said first and second communication devices.

4. Radio communication system for setting a radio channel for time-division multiplex communications between first and second communication devices by making a transmission speed allocated to a first-directional signal transmitted from said first communication device to said second communication device imbalanced with that allocated to a second-directional signal transmitted from said second communication device to said first communication device within one frame; wherein each frame having an imbalanced transmission speed is time-divided to a first transmission area to which a first transmission speed is allocated and to a second transmission area to which a second transmission speed differentiated from said first transmission speed is allocated, said first-directional signal and said second-directional signal are assigned to said first transmission area and to said second transmission area respectively, and in a case where a setting change request signal is set from either one of said first and second communication devices, an order of said first-directional signal and that of said second-directional signal are exchanged on a time axis in one frame, and said second-directional signal and said first-directional signal are allocated to said first transmission area and said second transmission area.

5. A radio communication system according to claim 4, wherein, in a case where a setting change request signal is set from either one of said first and second communication devices, correspondence between said first and second transmission areas and said first- and second-directional signals are repeatedly switched for each frame in the time domain within one frame.

6. A radio communication system according to claim 4, wherein said setting change request signal includes count data, a number of frames transferred between said first and second communication devices is counted according to said count data, and the switching in the time domain is executed at a timing when a specified count has been reached.

7. A radio communication system according to claim 4, wherein said setting change request signal includes given frame number data, and the switching in the time domain is executed at a timing when a frame according to said given frame number is transferred between said first and second communication devices.

8. Radio communication system for setting a radio channel for time-division multiplex communications between first and second communication devices by making a transmission speed allocated to a first-directional signal transmitted from said first communication device to said second communication device imbalanced with that allocated to a second-directional signal transmitted from said second communication device to said first communication device within one frame; wherein each frame having an imbalanced transmission speed is time-divided to a first transmission area to which a first transmission speed is allocated and to a second transmission area to which a second transmission speed differentiated from said first transmission speed is allocated, said first-directional signal and said second-directional signal are allocated to said first transmission area and to said second transmission area respectively, and in a case where a setting change request signal is set from either one of said first and second communication devices, an order of said first transmission area and that of said second transmission area are exchanged in the time domain within one frame, and second-directional signal and said first-directional signal are allocated to said first transmission area and said second transmission area.

9. A radio communication system according to claims 8, wherein, in a case where a setting change request signal is set from either one of said first and second communication devices, correspondence between said first and second transmission areas and said first- and second-directional signals are repeatedly switched for each frame in the time domain within one frame.

10. A radio communication system according to claim 8, wherein said setting change request signal includes count data, a number of frames transferred between said first and second communication devices is counted according to said count data, and the switching in the time domain is executed at a timing when a specified count has been reached.

11. A radio communication system according to claim 8, wherein said setting change request signal includes given frame number data, and the switching in the time domain is executed at a timing when a frame according to said given frame number is transferred between said first and second communication devices.

12. Radio communication system for setting a radio channel for time-division multiplex communications between first and second communication devices by making a transmission speed allocated to a first-directional signal transmitted from first communication device to said second communication device imbalanced with that allocated to a second-direction signal transmitted from said second communication device to said first communication device within one frame; wherein each frame having an imbalanced transmission speed is time-divided to a high-speed transmission area to which a high transmission speed is allocated and a low-speed transmission area to which a low transmission speed is allocated according to a specified ratio; and each of said first and second transmission devices comprises:

an allocating means for allocating either one of said first transmission area and said second transmission area to said first-directional signal and also allocating remaining one of said first transmission area and said second transmission area to said second-directional signal; and a synchronizing means for executing synchronization capture for said high speed transmission area and said low-speed transmission area according to said each frame subjected to time-division according to said specified ratio and also subjected to allocation by said allocating means.

13. A radio communication system according to claim 13; wherein said synchronizing means includes a M (Longest code) series linear shift register and said specified ratio of said high speed transmission area vs said low speed transmission area is set to $(2^N-2)$ vs 1.

14. A data transmission system comprising:

a first station, and a second station for receiving a first frame of data from said first station and for transmitting a second frame of data to said first station, wherein in a first time period, said first frame is transmitted at a first rate, and said second frame is transmitted at a second rate lower than said first rate, and in a second time period, said first frame is transmitted at said second rate, and said second frame is transmitted at said first rate.

15. The system of claim 14, wherein said first station comprises a base station, and said second station comprises a personal station.

16. The system of claim 15, wherein in said first time period, said first frame is transmitted after said second frame.

17. The system of claim 16, wherein in said second time period, said first frame is transmitted before said second frame.

18. The system of claim 17, wherein intervals for transmission of said first and second frames are controlled by a frame pulse provided in response to a clock signal regenerated by a receiving station.

19. The system of claim 18, wherein said first and second frames have variable durations.

20. The system of claim 14, wherein said first and second station communicate via a wireless communication link.

* * * * *